Feb. 26, 1935.　　J. R. OISHEI ET AL　　1,992,629
CLEAR VISION SCREEN
Filed Oct. 19, 1931　　3 Sheets-Sheet 1
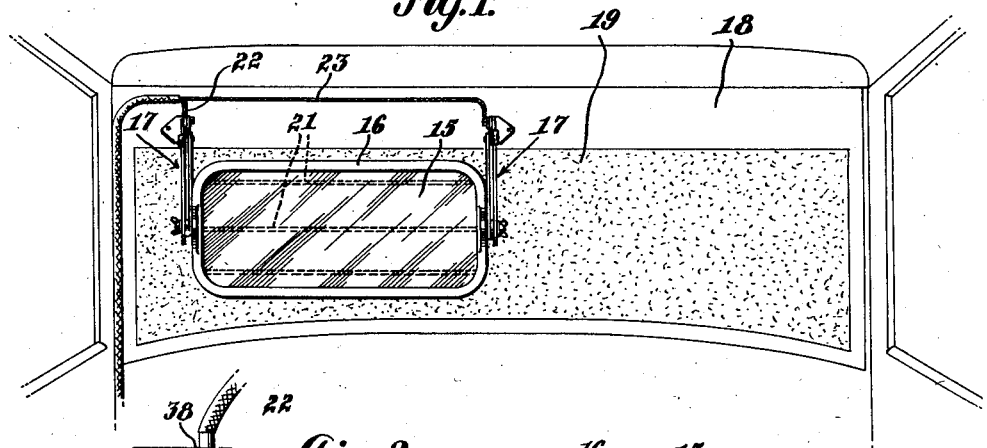
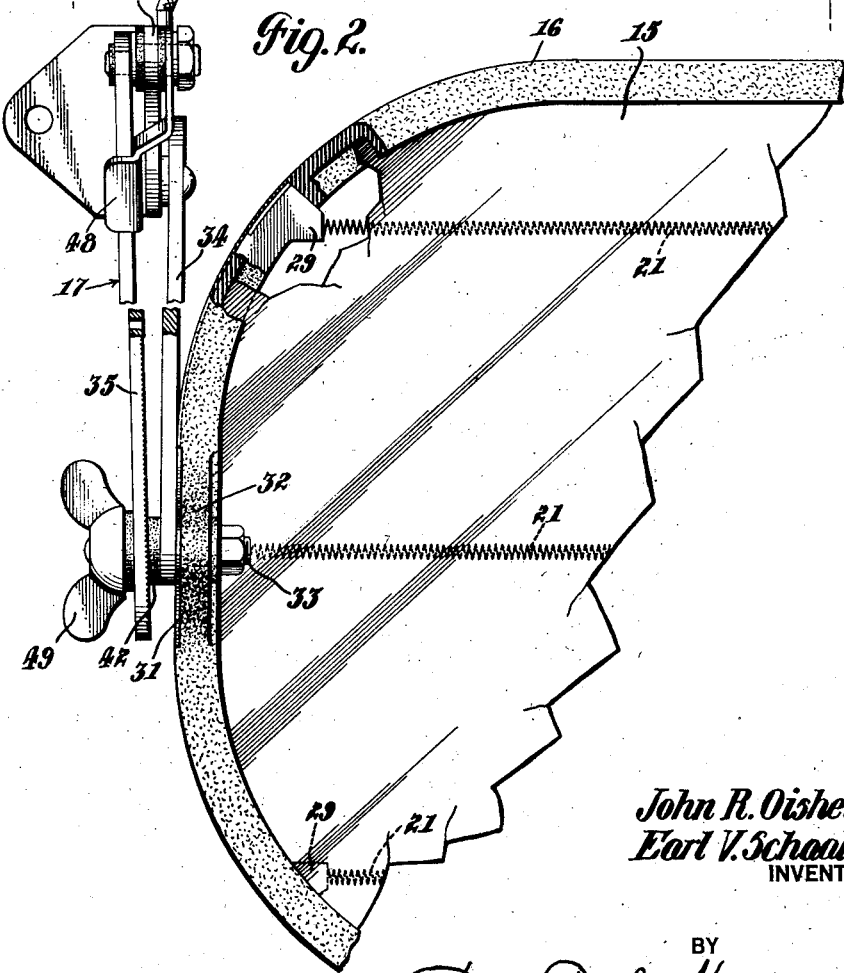
John R. Oishei,
Earl V. School,
INVENTORS
BY
Bean, Brooks & Henry ATTORNEY Feb. 26, 1935.   J. R. OISHEI ET AL   1,992,629
CLEAR VISION SCREEN
Filed Oct. 19, 1931    3 Sheets-Sheet 2
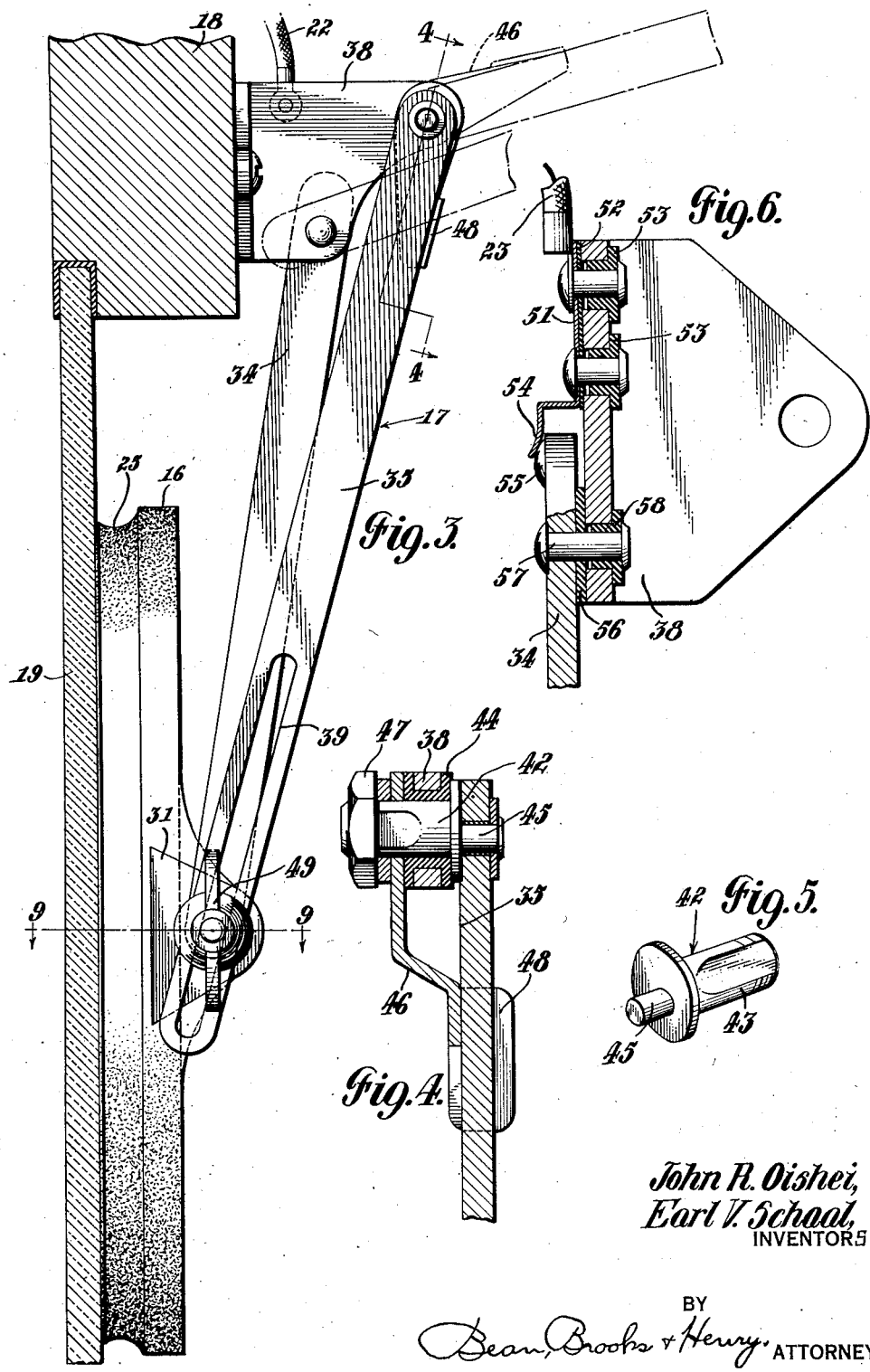
John R. Oishei,
Earl V. School,
INVENTORS
BY Bean, Brooks & Henry. ATTORNEY

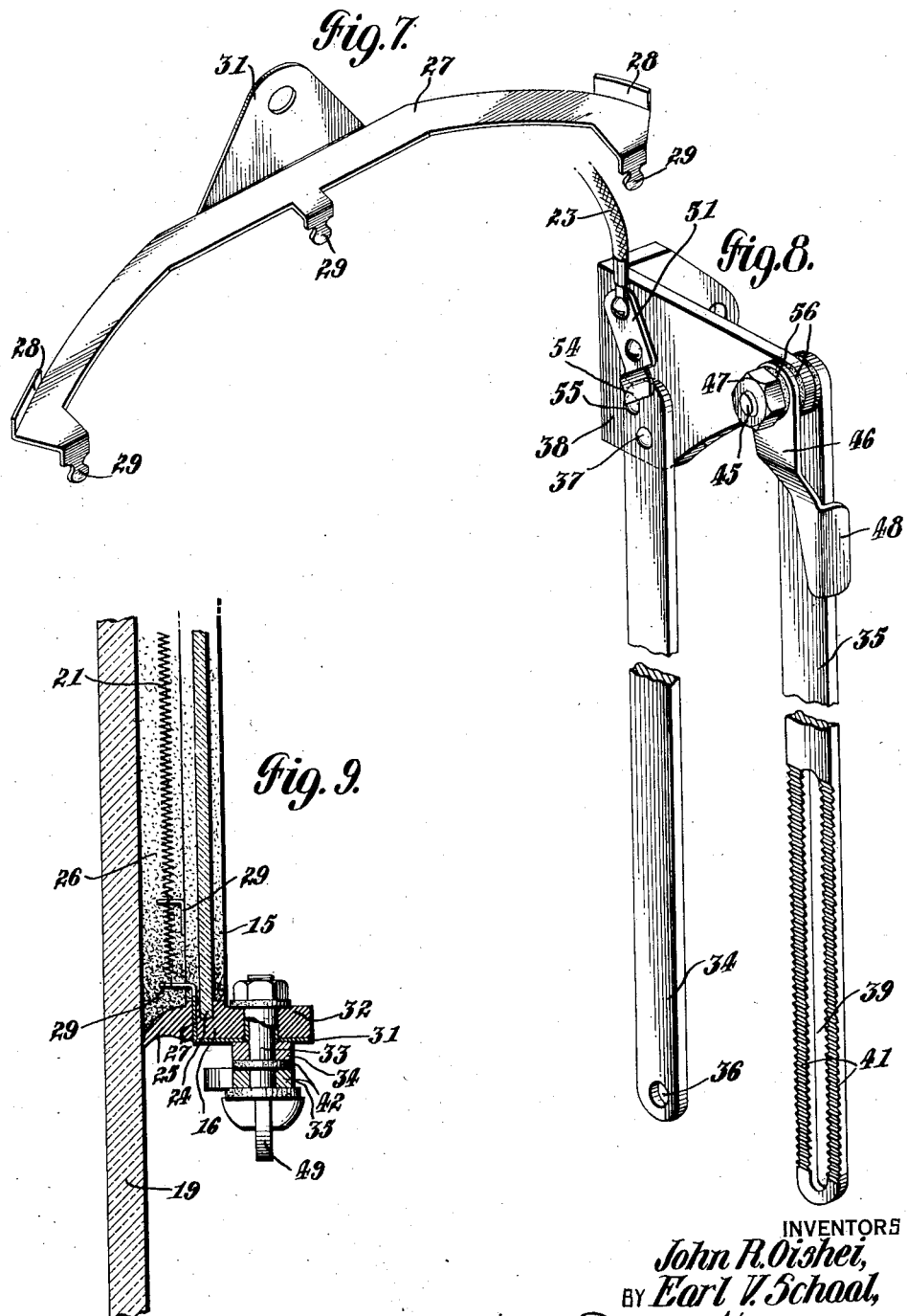

Patented Feb. 26, 1935

1,992,629

UNITED STATES PATENT OFFICE 1,992,629

CLEAR VISION SCREEN

John R. Oishei and Earl V. Schaal, Buffalo, N. Y., assignors to Trico Products Corporation, Buffalo, N. Y.

Application October 19, 1931, Serial No. 569,794

17 Claims. (Cl. 219—19)

This invention relates to vehicle accessories adapted to maintain the windshields of vehicles free of snow, ice, sleet and the like and has particular relation to that class of devices in which a transparent plate is provided, in slightly spaced relation to a surface of a windshield, to form an air space in the transparency between the atmospheres of the outside and the interior of a vehicle. Electrical heating units are conventionally carried by such devices, being disposed within the air space, for heating the windshield to prevent the accumulation of frozen moisture thereon.

The invention has for its object to provide a practical and efficient device in the nature of an auxiliary transparency for effectively maintaining the field of vision free of frost, sleet and other beclouding matter, and further to provide a device of this character, simplified in construction and one which may readily be positioned against the windshield in an expeditious manner.

These and other objects and advantages, including those arising from the novel relationship and formation of the component parts of the device, which render it efficient and economical in use and in production, will become apparent from the following description of one typical embodiment of the invention, reference being made to the accompanying drawings, wherein:

Fig. 1 is a front elevational view of the complete device, depicted as in its operative position, mounted upon an automotive vehicle;

Fig. 2 is a fragmentary front elevation of the left hand portion of the device depicted in Fig. 1, parts of the device being broken away and other portions appearing in section;

Fig. 3 is a side elevation depicting, in full lines, the normal operative position of the device relative to the vehicle windshield, and the broken lines indicating the inoperative position of the device;

Fig. 4 is a section taken along line IV—IV of Fig. 3;

Fig. 5 is a detail perspective of the eccentric element shown in Fig. 4;

Fig. 6 is a vertical sectional view illustrating the circuit breaking means associated with the supporting mechanism;

Fig. 7 is a perspective view of one of the plates which support the heating elements and connect the transparent plate unit to the supporting mechanism;

Fig. 8 is a perspective view of the supporting mechanism containing the circuit breaking means; and, Fig. 9 is a plan sectional view taken along line IX—IX of Fig. 3.

As shown in Fig. 1, the device includes the transparent plate 15, having a resilient frame or border 16, connected by supporting mechanism 17 to a header bar 18 or other part of a vehicle above the windshield 19, heating elements 21 extending across the plate and in electrical circuit, through the supporting mechanism, with wires 22 and 23 which extend to a suitable source of electrical energy.

The plate 15 is of generally rectangular form and seats within a recess extending about the continuous frame 16, the latter preferably being formed of soft, resilient insulating material, as rubber, having a forwardly extending flange 25 adapted for intimate contact with a surface of the windshield glass 19 for closing the space 26 between the glass and the plate 15. In each side portion of the frame is embedded a combined reinforcing and current conducting plate 27, having fins 28 for positively engaging the material of the frame, and protuberances 29 extending into the space 26 for supporting the heating elements 21. Ears 31 on the plates 27 overlie similarly shaped ears 32 formed on the frame 16, apertures extending through the ears for receiving bolts 33.

A pair of supporting arms 34 and 35 are engaged with each of the bolts 33, the arms 34 each having at one end an aperture 36 receiving one such bolt, and being pivoted at 37, adjacent the opposite end, to an angle bracket 38 which may be affixed to some portion of the vehicle above the windshield, as the header bar 18 of the illustration. The arms 35 each have an elongated slot 39 adjacent one end for receiving one of the bolts 33, the portions of each arm adjacent the slot being preferably roughened or serrated, as indicated at 41, for engagement with a compressible washer 42 carried by the bolt. The opposite ends of the arms 35 have openings for journalling an eccentric member 42 carried by each bracket 38.

The member 42 has a shank 43, non-circular and threaded at one end, journalled in a bushing 44 carried by each angle bracket 38 in spaced relation to the pivot point 37. The opposite end of each shank has an eccentric pivoted portion 45 which pivotally engages an arm 35. A tightening and locking lever 46 is fitted to the non-circular end of the shank and is retained thereon by a nut 47 threaded to the shank. At the free end of the lever is a handle portion 48 adapted to abut the arm 35.

The plate 15 may be raised from the operative position shown in full lines to the inoperative dotted line position of Fig. 3, adjacent the ceiling, by loosening the wing nuts 49 on the bolts 33 to allow the serrated surfaces of the arms 35 to disengage the compressible washers 42; and by then lifting the plate to bring the arms 34 and 35 to a substantially horizontal position. During this movement the bolts 33 will move in the slots 39 of arms 35. The device may be retained in inoperative or raised position by tightening the wing nuts to cause the serrated portions of the arms to grip the compressible washers. To return the device to normal position, the locking or wing nuts are again loosened, and the plate lowered to contact the flanges 25 of the frame with the windshield glass, and the nuts 49 again tightened.

During the latter operations the levers 46 are retained in their raised or dotted line positions of Fig. 3 in which the eccentric pintles 45 are above the axes of the shanks 43. The levers may then be rotated to press the portions 48 thereof into contact with the arms 35, thus lowering the pintles 45 and causing the frame 16 to be moved toward and pressed into more intimate contact with the windshield glass. The movement of the lever will thus compress the flange 26 of the frame and will lock the device in this position, for the reason that, as depicted in the drawings, the pintles 45 are so arranged that during movement as from the dotted to the full line positions of Fig. 3 they will pass slightly over the dead center position, a position on a line extending between the centers of the shanks 43 and bolts 33. The two parts 33 and 42 therefore constitute sections of a pressure applying member which may be moved across dead center to a locked and operative position.

The wire 22, as shown in Figs. 1 and 3, is connected to the left bracket 38 and therefore is electrically connected through left arm 34 (or 35), bolt 33, and left plate 27 with one end of the electrical heating means 21, which may comprise one or more strands of wire of high electrical resistance. The other wire 23 is connected to a plate 51 secured to the right bracket 38, as the device is viewed in Fig. 1, being insulated therefrom by an insulating plate and bushings 52 and 53, respectively. A spring contact finger 54 on the plate 51 engages a contact protuberance 55 on the right arm 34 when the latter is in operative position, the protuberance 55 being removed from the finger 54 as the device is moved to raised or inoperative position. The right arms 34 and 35 are electrically insulated from the bracket 38 by insulated washers 56, shown in Figs. 6 and 8, the rivet 57, comprising the right pivot 37, being insulated from the bracket 38 by an insulated bushing 58. The left arms may likewise be insulated from their bracket 38, if desired. When the parts are in the positions of Figs. 1 and 3, it will therefore be understood that the wire 23 will be in circuit with one end of the electrical heating means 21 through plate 51, finger 54, right arm 34, bolt 33, ear 31, and plate 27, and that when the device is in raised or inoperative position, the electrical circuit will be automatically broken.

It will further be understood that the device herein described and illustrated is merely exemplary of the principles of the invention, which may be applied to other devices having other arrangements and conformations of parts, all within the purview of this invention.

What is claimed is:

1. In an electrical heating device for vehicle windshields, a continuous flexible frame for contact with a windshield, a transparent plate engaged about its periphery by said frame, reinforcing plates embedded in said frame adjacent edge portions of the transparent plate, electrical heating elements connecting said reinforcing plates and extending across the transparent plate, and ears formed on said reinforcing plates for attachment to means for supporting said frame.

2. In an electrical heating device for vehicle windshields, a continuous flexible frame having a groove extending therearound, a transparent plate within the confines of said frame and having its peripheral portions seated in said groove, said frame having a continuous forwardly extending flange for contact with the windshield to space the plate from said windshield, a pair of reinforcing plates disposed at opposite sides of said frame, each of said reinforcing plates having portions embedded in said frame and protuberances extending into the space between the transparent plate and the windshield, heating elements attached to said protuberances and extending into said space, and said reinforcing plates having ears for attaching means for supporting the frame upon the vehicle.

3. In an electric heating device for a vehicle windshield, adapted for support from a portion of the vehicle adjacent the windshield, a pair of arms pivoted at one end on parallel axes to said portion of the vehicle, the opposite end of one of said arms having an aperture for passing a fastener, an electrical heating element having a fastener journalled in said aperture, the opposite end of the other of said arms having a slot slidably receiving said fastener.

4. In an electric heating device for a vehicle windshield adapted for support from a portion of the vehicle adjacent the windshield, a flexible frame for contact with a windshield, a transparent plate engaged about its periphery by said frame, reinforcing plates embedded in said frame at opposite sides thereof, an electrical heating element connecting said reinforcing plates and extending across the transparent plates, an ear formed on each of said reinforcing plates, a pair of arms adjacent each ear, one of each pair of arms being pivoted to an ear and the other of each pair of arms being connected to the first mentioned arm of the pair for pivotal and longitudinal movement relative thereto, bracket means on said portion of the vehicle, each of said arms being pivoted to said bracket means, the arms of each pair being pivoted on parallel axes, one pair of arms being electrically insulated from the other pair of arms at the bracket means, and electrically connected through said reinforcing plates and electrical heating element.

5. In a vehicle accessory, a bracket for attachment to a vehicle, a movable member, an arm pivoted at one end to the bracket and at the opposite end to said movable member, a second arm pivoted adjacent one end to said movable member, the pivot point of the latter pivot connection being adjustable to vary the effective length of said second arm, the other end of said second arm being pivoted to an eccentric member, an eccentric portion of the latter being pivoted to said bracket.

6. In a vehicle accessory, a bracket for attachment to a vehicle, a movable member, an arm pivoted at one end to the bracket and connected at the opposite end to the movable member, a second arm, pivot means connecting the second arm to the first mentioned arm and pivot means connecting the second arm to the bracket, one of said pivot means comprising a pivoted member having an eccentric portion pivoted to the second arm, whereby movement of said pivoted member about its pivot will vary the effective length of said second arm to effect movement of said movable member.

7. In an electric heating device for a vehicle windshield adapted for support from a portion of the vehicle adjacent the windshield, a flexible frame having a forwardly extending portion for contact with a windshield, a transparent plate engaged about its periphery by said frame, said plate being spaced from the windshield by said forwardly extending portion, an electrical heating element extending between the windshield and said plate, an arm on each side of the frame pivoted at one end to the frame by means serving to electrically connect each arm with one end of the heating element, the opposite end of each arm being pivoted to supporting bracket means on said portion of the vehicle, an eccentric member pivoted to said supporting bracket means adjacent to each of said arms, and a second arm pivoted to each of the eccentric members, the opposite ends of the second arms having slidable and rotatable connections to the first mentioned arms adjacent said means for electrically connecting the first mentioned arms and the heating element, whereby the frame may be swung into adjacency with or away from the windshield, and a switch arm for contacting one of said arms when the frame is in adjacency with the windshield.

8. In an accessory for a vehicle windshield and adapted for support from a portion of the vehicle adjacent the windshield, a pair of arms pivoted at one end on parallel axes to said portion of the vehicle, a frame pivoted to the opposite end of one of said arms, the opposite end of the other of said arms being slidably and pivotally connected to said opposite end of the first mentioned one of said arms.

9. In a vehicle accessory, a bracket for attachment to a vehicle, a movable member and means for pivotally connecting it to said bracket including an arm, pivot means at one end of the arm for connecting it to said bracket and pivot means at the other end of said arm for connecting it to said movable member, one of said pivot means comprising a pivoted member having an eccentric portion pivoted to said arm.

10. Means for supporting a vehicle accessory adjacent a vehicle, comprising a pair of relatively movable members, an eccentric member having a part pivoted to one of said first mentioned members and an eccentric part pivoted to the other one of said first mentioned members, and an arm fixed against rotation to said eccentric member, said arm having a portion for abutment with one of said first mentioned members to limit the pivotal movement of said eccentric member relative to said first mentioned members.

11. An auxiliary window for use against a windshield to define a field of vision, and having a frame, means supporting the frame against the windshield, and a pressure applying member having one section pivotally mounted at one end to the frame and a companion section pivotally mounted to a fixed part of the motor vehicle, said companion section having a part off center pivotally connected to the opposite end of the first section and movable across a line joining the pivotal mounting axes of said sections to lock the pressure applying member in an operative position.

12. Means for supporting a transparent plate having a flexible frame thereabout, comprising a pair of stress distributing plates adapted to be embedded in said frame at opposite sides thereof, each plate having two bars associated therewith, a common pivot connecting one end of each of the two bars to the plate, bracket means pivotally connecting on spaced pivots the other ends of the two bars, one of said two bars being of fixed length, and the other of said two bars having means associated therewith for varying the effective length thereof.

13. In a vehicle windshield accessory adapted for support from a portion of the vehicle adjacent the windshield, a flexible frame for contact with a windshield, a transparent pane engaged about its periphery by said frame, plates embedded in said frame at opposite ends thereof for reinforcing the frame, each plate having a supporting ear, bracket means on said portion of the vehicle, a pair of arms adjacent each ear, one arm of said pair being pivoted at one end to the ear and at the opposite end to said bracket means, and the other arm of said pair being pivoted at one end to the bracket means on an axis parallel to the first mentioned pivot to the bracket means and at the other end being connected to the first mentioned arm of the pair for relative pivotal and longitudinal movement.

14. In an electrical heating device for a vehicle windshield, a continuous flexible and electrically insulating frame having a groove extending therearound, a transparent pane within said frame and having its peripheral portions seated in said groove, said frame serving to space the pane from the windshield, a plate disposed at each of two opposite sides of said frame and extending along the frame for reinforcing it, each plate having protuberances extending into the space between the pane and windshield, and a heating element extending across said space and connecting the protuberances of the opposed plates.

15. In an electrical heating device for a vehicle windshield, a flexible and electrically insulating frame, a transparent pane engaged about its periphery by said frame, reinforcing plates embedded in the frame at substantially opposite sides thereof, a heating element extending between the plates in substantial parallelism with the pane, said plates having protuberances extending beyond the inner surface of the frame for connection with the heating element and ears disposed outwardly of the outer surface of the frame for connection to means for supporting and supplying electrical energy to the device.

16. In an electrical heating device for a vehicle windshield, a pair of metallic arms connected to a portion of the vehicle and extending into adjacency with the windshield, a transparent pane and a flexible frame extending therearound, metallic plates embedded at opposite ends of the frame for reinforcing said frame, each of said plates having an ear extending beyond the surface of the frame and connected to one of said arms, an electrical heating element extending between said plates and between the pane and windshield, and means for connecting said arms to a source of electrical energy, said arms being electrically connected via the plates and heating element.

17. In a device for vehicle windshields, a flexible frame of generally oblong form, a transparent pane engaged about its periphery by said frame and spaced from the windshield by said frame, the frame at opposite ends having ears formed thereon, a substantially rigid plate embedded in each of said opposite ends and extending therealong for reinforcing said ends and adjacent portions of the frame, and each plate having a portion extending beyond the surface of the frame and lying along the surface of the adjacent ear, said ears and portions of the plates having openings therethrough for attaching means for supporting the device.

JOHN R. OISHEI.
EARL V. SCHAAL.